March 21, 1967  H. W. BOTELER  3,310,281
DIAPHRAGM VALVE
Filed Nov. 16, 1965  5 Sheets-Sheet 1

INVENTOR.
HENRY W. BOTELER
BY
ATTORNEY

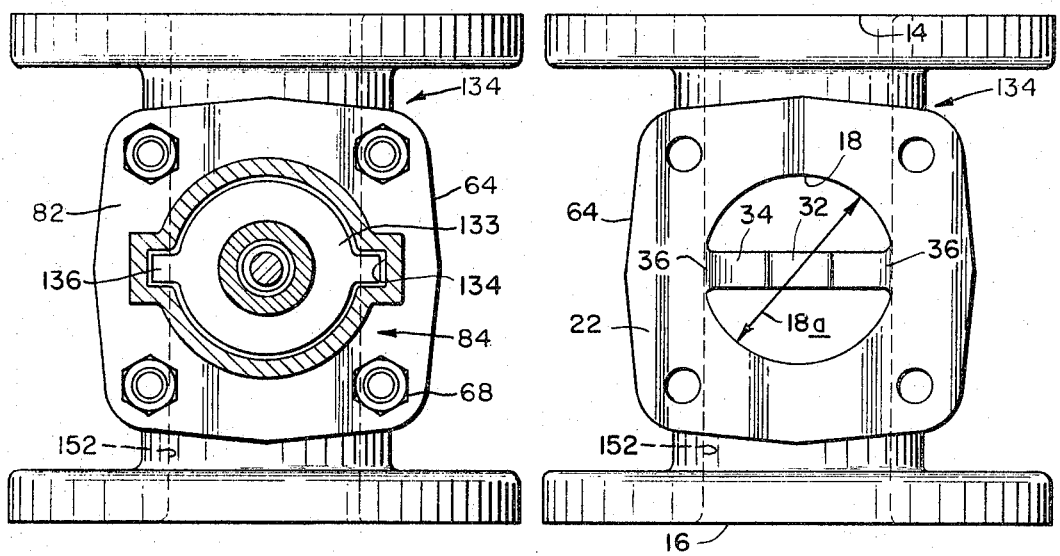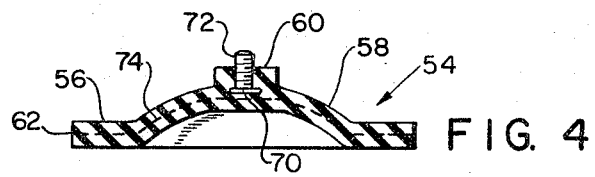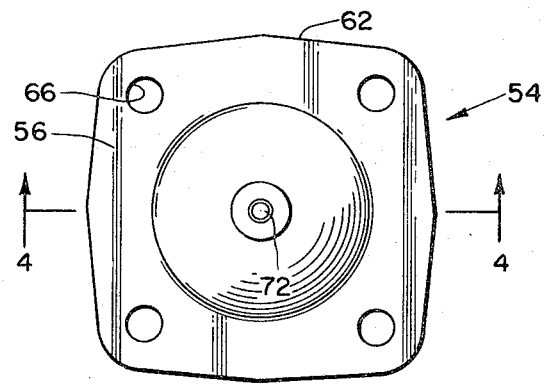

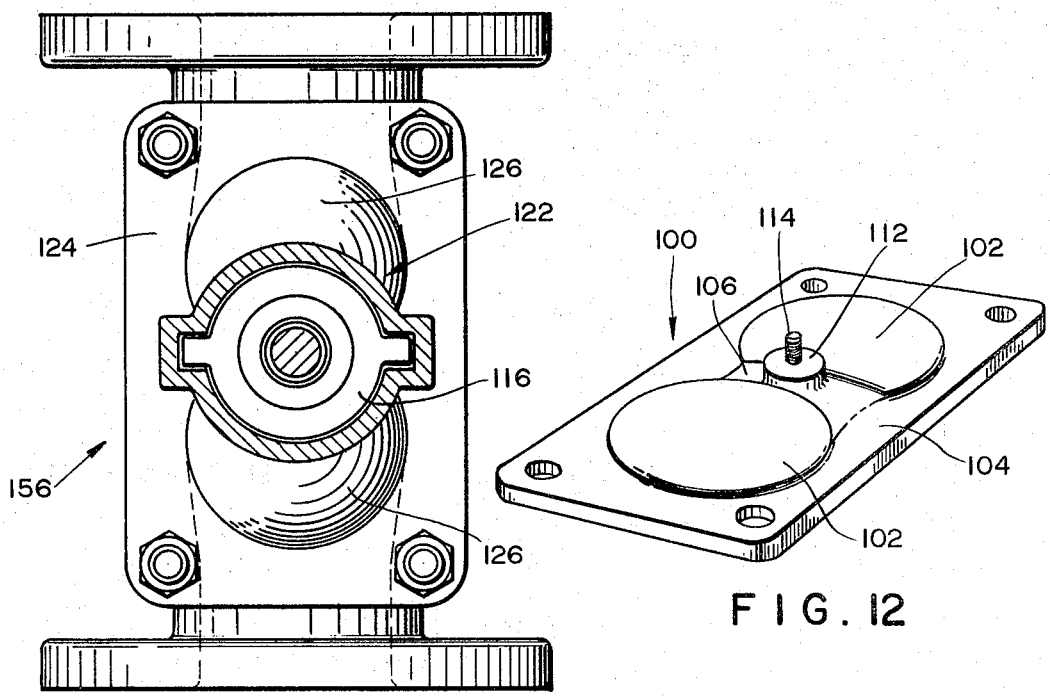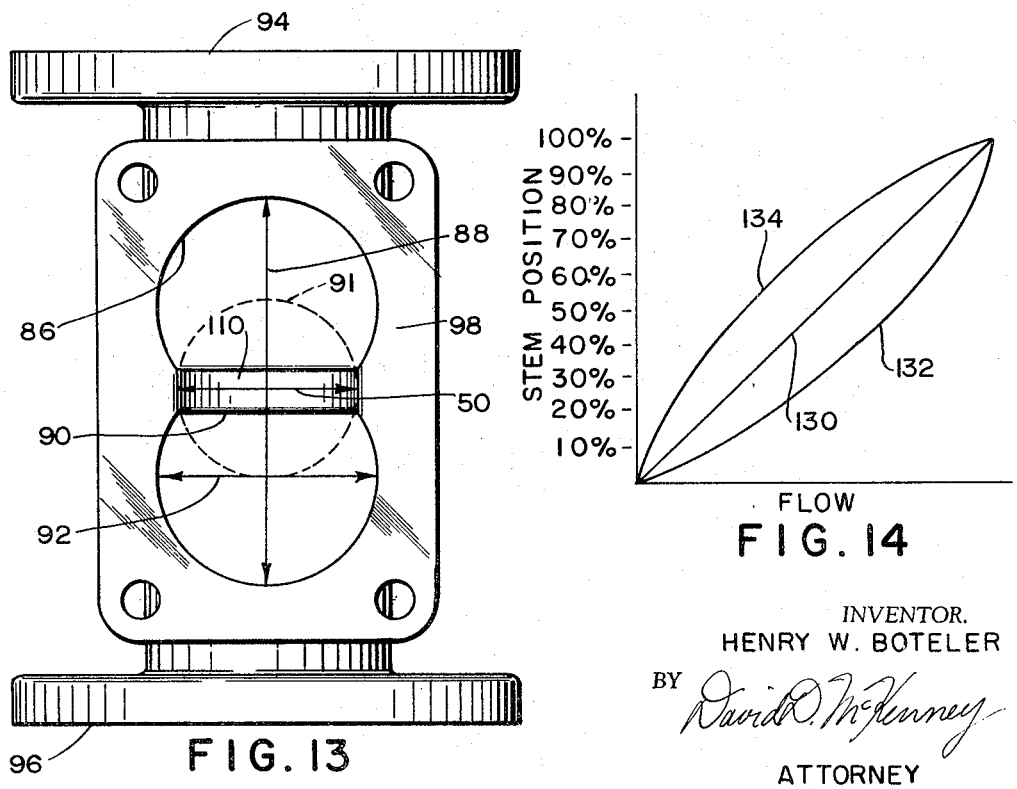

United States Patent Office 3,310,281
Patented Mar. 21, 1967

3,310,281
DIAPHRAGM VALVE
Henry W. Boteler, East Greenwich, R.I., assignor to Grinnell Corporation, Providence, R.I., a corporation of Delaware
Filed Nov. 16, 1965, Ser. No. 508,128
22 Claims. (Cl. 251—331)

This application is a continuation-in-part of application Ser. No. 315,817, filed Oct. 14, 1963 and entitled, Diaphragm Valve, now abandoned.

This invention relates to improvements in diaphragm valves. More particularly, it has to do with a diaphragm valve in which there is a sharp reduction in the cross-sectional area of the flow between the inlet end of the passage and the valve seat when the valve is in the open position. With such a construction, and especially with such a construction in which the reduction is located as close as possible to the seat, a characteristic flow curve is achieved which is much more suitable for control valve applications than the prior art diaphragm valves.

A typical diaphragm valve of the kind to which the present invention relates has a body with a flow passage therethrough between its inlet and outlet ends, with a diaphragm opening on one side of said body and communicating with said passage and with a weir extending part way across the passage from the side thereof opposite the opening. The top surface of the weir is concaved with respect to the plane of the opening rim and has its ends blending smoothly therewith. A diaphragm having its periphery clamped to the opening rim and having its domed central portion covering the opening achieves valve closure by being pressed against the weir's top surface and achieves valve opening by being withdrawn from such surface. The diaphragm movements are achieved by a compressor adjacent the back side of the diaphragm and secured to the center thereof. This compressor and other parts of the actuating mechanism are housed in a bonnet which serves to clamp the diaphragm periphery as above described.

To those familiar with this kind of diaphragm valve it is well known that the area of the diaphragm opening in this kind of valve has always been of such shape and size that the cross-sectional area of the flow passageway is not reduced or at least not greatly reduced at the seat. Stated another way, with a diaphragm having the usual generally circular center portion the area of this portion projected on the plane of the diaphragm peripheral portion has always been relatively large, for example, much larger than the area of the flow passage inlet or outlet openings. The reason for this prior art construction is clear. Where the weir has been high and the concavity of the domed central diaphragm portion has not been deep, approximately twice the cross-sectional area of the passage must be covered by the diaphragm circular center portion, inasmuch as one such area is presented upwardly toward this diaphragm center portion on either side of the weir. As a result, the generally circular diaphragm opening has had an area considerably greater than the area of either of the inlet and outlet openings, since the effort has been to avoid reduction in passage area as much as possible. This diaphragm opening area has not always been twice as great as the inlet and outlet areas because achievement of a completely undiminished cross-sectional area for the flow passage does not require this relationship, and in some prior art constructions some small restriction of the flow passage cross-sectional area has been tolerable. However, as far as I know, substantial diminution of the cross-sectional area of the flow passage has been regarded as a disadvantage and has been avoided as much as possible.

Where the prior art has employed a low weir and the concavity of the domed central diaphragm portion has been great the area of the diaphragm opening (still generally circular) has also been much larger than the area of either of the passage ends because of the necessity to provide a slope on the sides of the seating which will permit a rolling action of the domed central diaphragm portion and also because it has been important in this kind of valve to avoid any reduction in the cross-sectional area of the flow passage when the valve is open. Thus, even though there have been efforts to reduce the size of the diaphragm opening in no-weir valves, the diaphragm openings in such valves have still been considerably larger than the inlet or outlet openings in order to avoid any passage area reduction.

The present invention results from my discovery that by sharply reducing the cross-sectional area of the flow passage between the inlet opening and the seat, and preferably by locating this reduction as close as possible to the seat a characteristic curve (flow vs. stem position) results which is much more useful in control work than the characteristic curves of the prior art diaphragm valves.

In by far the most preferred form this invention contemplates a diaphragm valve with a body having a generally circular diaphragm opening and generally circular end openings and further contemplates that the diameters of these end openings be at least as great as the diameter of the circular diaphragm opening. In this preferred form the area of the flow passage approaching the seating from the inlet (either end opening) is sharply reduced even when the diaphragm is in its fully opened position. Thus if the diaphragm is of the kind having only a shallow domed portion (and the body seating is therefore formed on a high weir) the wide open position involves a maximum spacing of the diaphragm from the seat which is much less than the diameter of the diaphragm opening in the body and hence the area of the flow passage at the seating will perforce be much less than the end opening areas, and this provides the above mentioned desirable sharp reduction in cross sectional area of flow. Also if the diaphragm is of the kind at the opposite extreme and has a deeply domed portion the required shape on the sides of the diaphragm dome and body seating results in a maximum flow passage area at the seating which is also less than the end opening areas.

The performance of such valves, and others which may also be in accordance with the invention, is particularly useful for control work because the characteristics of such valves more closely approach the exponential form than any prior art diaphragm valves, and such exponential curves permit a given change in stem position to produce the same percentage change in flow anywhere in the range of stem movement.

The importance of such flow control, as distinguished from merely opening and closing a fluid conduit, is best understood by first imagining an ideal valve. As stated, such a valve would be one in which each increment of stem movement produces the same percentage change in flow. This means that when stem movement (abscissa) is plotted against flow (ordinant) the curve rises steeply from the intersection of the axes and then levels off sharply. In the ideal valve the largest value of flow (end of the curve) would seem to be the flow through a straight piece of pipe of the size with which the valve is intended to be used.

There are, however, at least two reasons why it is not practical to have control valves with the same cross-sectional flow passage area at the seat as in the pipe with which the valve is to be used. One reason is that even though valves can be designed which have equal percent curves right up to such full flow rates the control of the flow in the actual system is not on such an equal percent basis because of the friction losses in the pipe and other accessories. Unless the valve in its wide open position constitutes a substantial part of the total system pressure drop an increment of valve stem movement will have a relatively small effect on total system flow. Accordingly, to assure a suitable degree of control in the valve positions near the wide open position, it is conventional to select a valve which in its wide open position has a cross-sectional passage flow area at the seat substantially smaller than the full pipe cross-sectional area.

Another reason why it is not practical for a control valve to have its flow passage area in the wide open position equal to the pipe cross-sectional area is that to make such a valve have an equal percent curve essentially involves using very large closure members and operating them close enough to their correspondingly large seats so that a change in stem position has a significant effect on flow. This has several difficulties, including the extra size of the valve to accommodate the large parts.

Diaphragm valves have been conventionally constructed for on-off service with maximum flow in the wide open position, flow which approaches that of the pipe with which the valve is to be used.

One reason for this development of the diaphragm valve has been the assumption that because of its inherent limitations an "equal percent" cannot be achieved throughout the range of valve movement. More particularly, it has been supposed that the diaphragm quickly loses control of the flow as the open positions are approached. It must be borne in mind here that diaphragm valves conventionally press a closure member (diaphragm) directly down on the seat and have not had the opportunity of progressive seating exemplified by the contoured plug of the plug valve. The result has been that when the diaphragm is moved a relatively small distance away from the seat the effect of further movement on flow becomes sharply less, and in terms of characteristic curves the result is far from exponential and to a great extent is not even linear.

My discovery is that, surprisingly, when the cross-sectional area of the flow passage is reduced sharply between the inlet opening and the diaphragm seat by a certain relationship of seating length to the dimensions of the end openings, the pressure drop required in control valves is achieved and in addition there is a surprising change in the conventional characteristic curve toward the exponential form. A particular advantage of this improved curve is that it approaches the exponential form at the wide open position as well as elsewhere.

In a preferred form of my invention the above-described desired results are achieved by having the diaphragm opening in the body and the end openings in the body all substantially circular and by having the areas of each of the end openings at least as great as the area of the diaphragm opening. In addition it is preferred that these desired results be achieved by providing each portion of the flow passage which extends inwardly from the end openings with a cross sectional area at least as great as the area of the diaphragm opening. This latter arrangement assures that the desired reduction in flow passage cross sectional area take place as close to the seating as possible. As the flow passage approaches the seating its cross sectional area must eventually become much less than the area of the diaphragm opening, this being the objective of the invention and the necessary result of having each of the end opening areas at least as great as the diaphragm opening area. In the preferred form of the invention the portion of the passage which maintains a cross sectional area at least as great as the diaphragm opening area is preferably the portion along which the interior body walls form an endless intersection on a plane at right angles to the longitudinal body axis. Stated another way, the passage maintains its relatively large cross sectional area inwardly from the opening ends at least until it reaches the diaphragm opening. Between this point and the seat the flow passage is formed in part by the diaphragm, and the intersection of the body walls on each cross sectional plane is not endless.

In some cases it may not be desirable to provide circular end and diaphragm openings in the body. In such cases the described desirable results of this invention may be achieved by having the areas of the end openings at least as great as the area of an imaginary circle which has a diameter equal to the distance between the ends of the seat. Thus as has been previously explained, the distance across the diaphragm opening at the seat (which is the distance between the ends of the seat in valves of this kind) determines the size of the flow passage area which opens and closes. When the diaphragm opening is circular this distance is the diameter of the circle, but even when the diaphragm opening is non-circular the desired reduction in flow passage area will always obtain if the area of each of the end openings are at least as great as the area of a circle having a diameter equal to the distance between the seat ends. The fact that the actual diaphragm opening area is greater than the area of such an imaginary circle does not effect the reduction in flow passage area which is necessitated by the relationship thus expressed.

In diaphragm valves of the kind to which this invention relates non-circular body end openings are not common, and in those non-circular end openings which may be used the maximum dimension is not likely to be very different than the minimum dimension. Accordingly I have found that by having the maximum dimension of the end opening always greater than the distance between the seat ends the desired reduction in flow passage area will obtain as a practical matter.

It is more common to have non-circular passage portions inwardly of the end openings, but here again the maximum and minimum dimensions of such portions are not very different in practice, and as long as the maximum dimension along the passage portion is greater than the distance between the seat ends the reduction in flow passage area can be expected as a practical matter.

Accordingly, it is one object of the present invention to provide a diaphragm valve with a flow passage therethrough which has its cross-sectional area sharply reduced between the inlet opening and the seat.

Another object is to provide a diaphragm valve of the kind described in which a certain relationship between the diaphragm opening in the body and an end opening in the body provides the desired sharp reduction in flow passage area.

Another object is to provide a diaphragm valve of the kind described in which the area of a body end opening is at least as great as the area of a circle having a diameter equal to the distance between the seating ends.

Another object is to provide a diaphragm valve of the kind described in which the body end openings and the body diaphragm opening are circular and in which the diameter of each of the body end openings is at least as great as the diameter of the body diaphragm opening.

Another object is to provide a diaphragm valve of the kind described in which the reduction in the cross-sectional area of the flow takes place closer to the seat than to the inlet opening.

Another object is to provide a diaphragm valve of the kind described in which the greater part of the reduction in cross-sectional area of the flow passage takes place immediately adjacent the seat.

Another object is to provide a diaphragm valve of the kind described in which the cross-sectional area of certain portions of the flow passage between the body end openings and the seat is at least as great as the area of the body diaphragm opening, the portions being those along which the interior body walls form endless intersections on cross-sectional planes at right angles to the body's longitudinal axis.

Another object is to provide a diaphragm valve of the kind first described in which the diaphragm opening is generally circular and has an area not substantially greater than the cross-sectional area of the passage at the inlet opening.

Another object is to provide a diaphragm for which the characteristic curve resulting from a plot of flow against stem position for a constant pressure drop approaches closer to an exponential form than previous diaphragm valves.

Another object is to provide a novel diaphragm valve which is particularly useful as a control valve, but which employs many parts previously used in prior art valves.

Another object is to provide a novel diaphragm valve which is inexpensive to manufacture, efficient in operation and easy to install and service.

Other objects will appear hereinafter.

The best mode in which it has been contemplated applying the principles of the present invention are to be found in the accompanying drawings but these are to be deemed primarily illustrative for it is intended to cover by suitable expression in the appended claims whatever of patentably novelty exists in the invention disclosed.

In the drawings:

FIGURE 3 is a cross-sectioned plan view taken on line 3—3 of FIG. 1;

FIGURE 3A is a top plan view of the body of FIGS. 1 to 3;

FIGURE 4 is a cross-sectioned side elevation view of the diaphragm of FIGS. 1 to 3;

FIGURE 5 is a top plan of the diaphragm of FIGS. 1 to 4; and

Figures 1, 2:
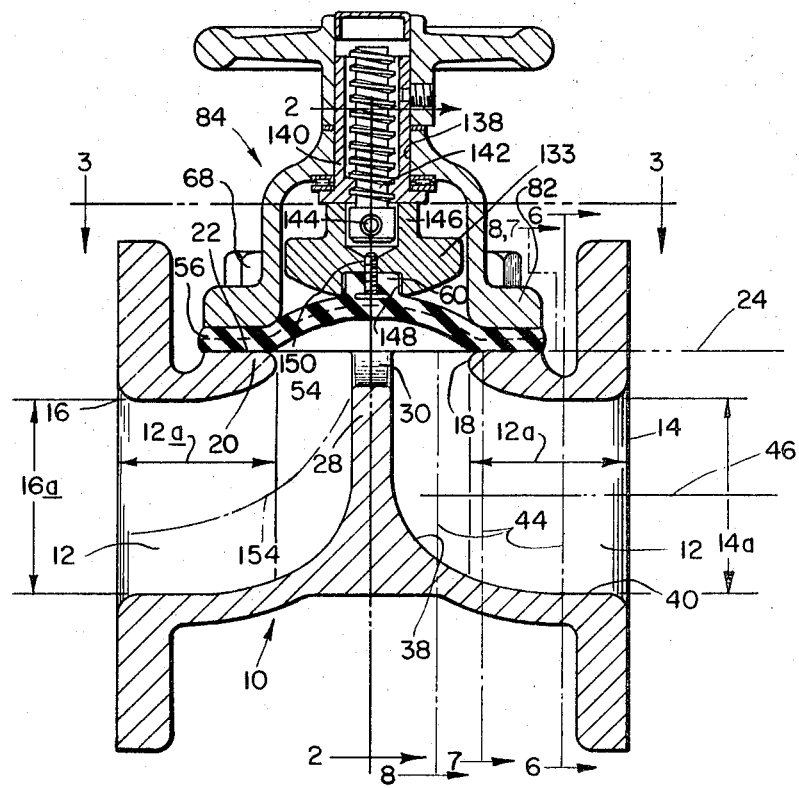
FIGURE 1 is a cross-sectional side elevation view of a valve which is one embodiment of the present invention, the valve being shown in the open position.
FIGURE 2 is a cross-sectioned end elevation view taken on line 2—2 of FIG. 1.
Figure 6:
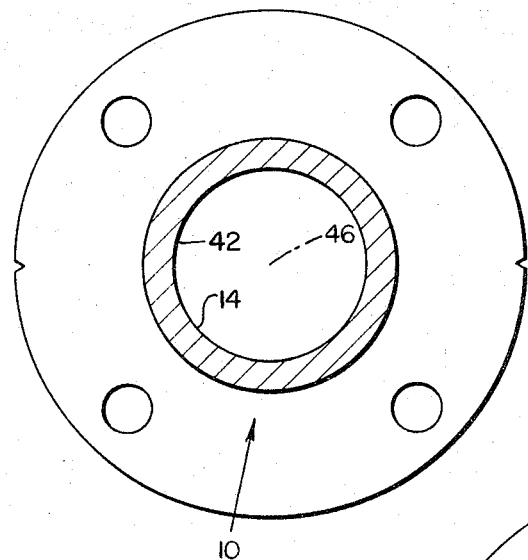
Figure 7:
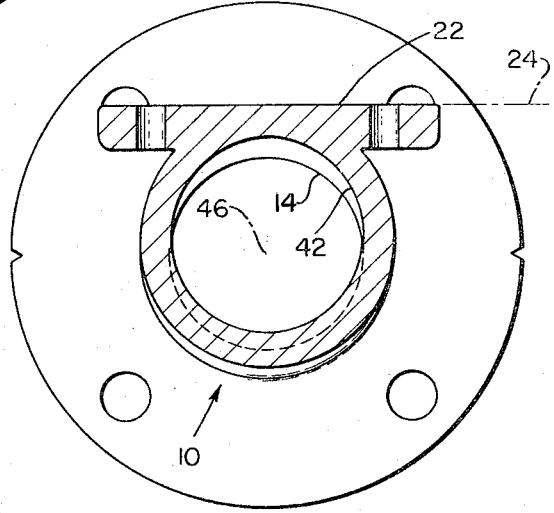
Figure 8:
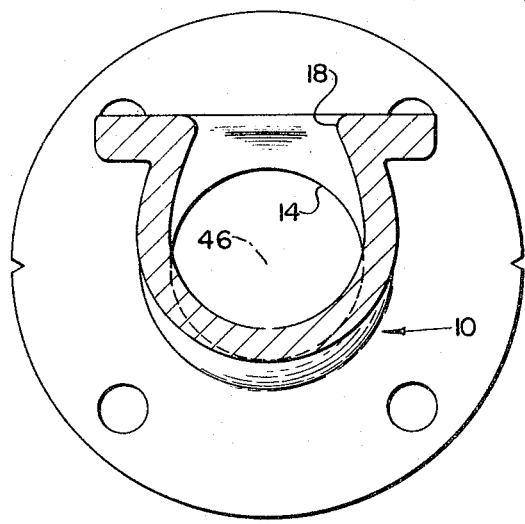

FIGURES 6, 7 and 8 show the shapes of the intersections of the interior body walls on the cross-sectional planes taken on lines 6—6, 7—7 and 8—8 of FIG. 1.

Figure 9:
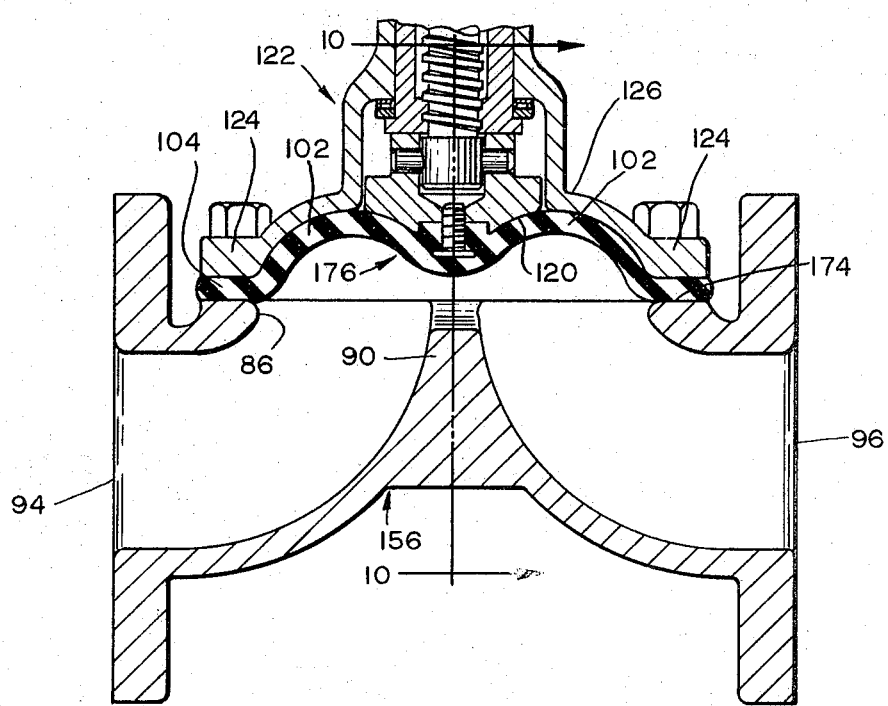
Figure 10:
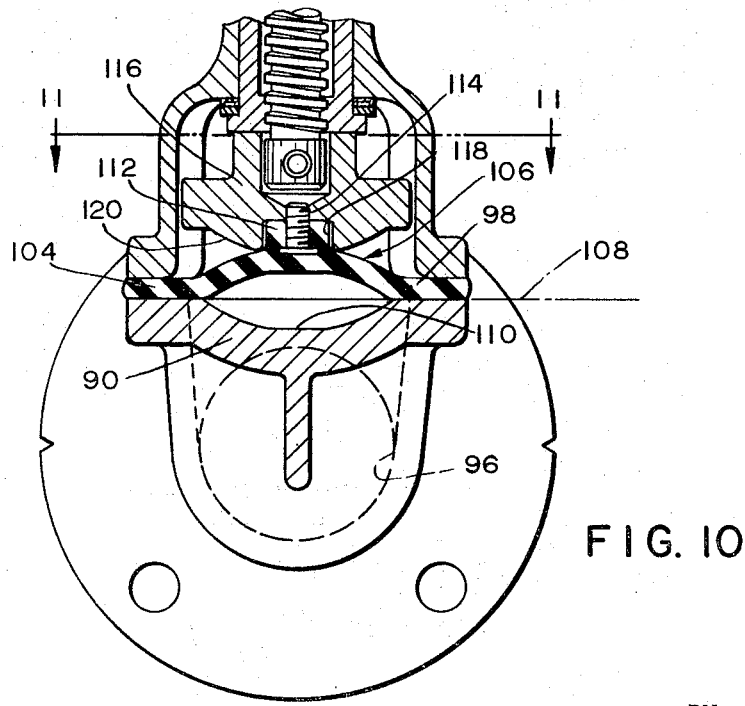

FIGURE 9 is a cross-sectioned side elevation view of another embodiment of the invention;

FIGURE 10 is a cross-sectioned end elevation view taken on line 10—10 of FIG. 9;

FIGURE 11 is a cross-sectioned plan view taken on line 11—11 of FIG. 10;

FIGURE 12 is a perspective view of the diaphragm used in the valve of FIGS. 9 to 11;

FIGURE 13 is a top plan view of the body used in the valve of FIGS. 9 to 11;

FIGURE 14 is a graph showing the three basis types of flow characteristics of valves.

Referring now more particularly to the drawings, FIG. 1 shows a side elevation view of a preferred embodiment of the invention in which the body, designated by numeral 10, has a passage 12 therethrough which extends between end openings 14 and 16. There is a diaphragm opening 18 in the body between the end openings and communicating with the passage on one side thereof. This opening is surrounded by a rim 20 which has a surface 22 lying in a flat plane 24. In this particular embodiment the radial extent of the surface is sufficient to necessitate a flange addition 26 to the body, particularly noticeable in the cross-sectioned end view of FIG. 2.

Opposite the opening 18 a weir 28 integral with the body rises toward the opening and provides on its top surface 30 a narrow band seating which is concaved with respect to plane 24, having a generally straight center portion 32 (see FIG. 2) spaced below this plane and having curved end portions 34 turning upward from the ends of the center portion and then curving over the other way at 36 to blend smoothly and gradually with the rim surface 22. The sides 38 of the weir slope smoothly and gradually from the bottom of the passage 40 at the ends of the passage.

In plan view (FIG. 3A) it is seen that the opening 18 is generally circular so that as the passage 12 approaches this opening on either side of the weir its shape changes somewhat from circular, at the end openings, to generally semi-circular. This is shown in FIG. 3A. The diameter 18a of the diaphragm opening 18 is the same as each of the diameters 14a and 16a of the end openings 14 and 16. As a result the transition of the flow passage 12 from one of these circular end openings to a substantially semi-circular shape as seen in FIG. 3A involves a reduction in the cross-sectional area of the flow passage which is in accordance with my discovery. Preferably this reduction takes place as near the weir as possible, and hence a substantial portion of the flow passage extending inwardly from each end opening in this embodiment has an area at least as great as the area of the diaphragm opening. For example, in FIGS. 1 to 8 the passage portion which has a cross-sectional area at least as great as the area of the diaphragm opening 18 is the portion 12a, at either end of the flow passage, in which the interior body walls form endless intersections on planes 44 at right angles to the body's longitudinal axis 46. In FIGS. 6 and 7 these endless intersections are indicated at 42, and these views show that the areas enclosed by these intersections are as great as the areas of the end openings. FIG. 8, on the other hand, shows that the intersection of the interior body walls on the plane 8—8 in FIG. 1 is not endless because this plane lies within the diaphragm opening 18. I have discovered that by far the best results may be expected when the areas within the endless intersections 42 described are at least as great as the area of the diaphragm opening 18. I recognize that the areas within these intersections may not exactly represent the actual flow passage areas because the flow passage is not always parallel to the axis 46, but area measurements in planes which are thus perpendicular to the body longitudinal axis are easier to make than actual measurements in planes which are at a variety of angles to such axis along the flow passage, and, as a practical matter, if the areas within all endless intersections 42 described are maintained at least as great as the diaphragm opening area the location of the actual flow passage area reduction will be sufficiently close to the seating to cause the valve to be in accordance with this aspect of the invention.

For the arrangement of FIGS. 1 to 8 the diaphragm has the construction of FIGS. 4 and 5 where it is shown apart from the other valve components to reveal its unflexed shape. Preferably the diaphragm material is a molded rubber or rubber-like material with a flat peripheral portion 56, a domed central portion 58 and an integral boss 60. The peripheral portion has an outer edge 62 conforming to the edge 64 of the body opening flange 26 and also holes 66 which accommodate bolts 68 as will be later explained. The central diaphragm portion 58 is generally circular and conforms to the shape of the body opening 18. The boss 60 has embedded therein the head 70 of a threaded stud 72 which projects from the boss, as shown. A fabric layer 74 is also embedded in the diaphragm throughout the full extent thereof and provides a reinforcement of the flexible material against bursting from the line pressures handled by the valve. At the same time the fabric does not interfere with the flexing of the domed central diaphragm portion to open and close the valve.

Referring again to FIGS. 1, 2 and 3 the diaphragm 54 has its peripheral portion clamped to the body rim surface 22 by the flange 82 of a bonnet 84. This bonnet flange 82 is generally coincidental with the flat body rim surface 22 and the peripheral diaphragm portion 56, and has holes for accommodating the usual bolts by which the bonnet and body flanges are held together in the well known way.

In the embodiment of FIGS. 1 to 8 the diaphragm opening 18 in the body is substantially circular so that the distance between the seating ends 36 is equal to the diameter 18a of this opening. It is this distance between the seating ends which helps determine the cross-sectional area of the flow passage at the seating, and, accordingly, in FIGS. 1 to 8 the area of the diaphragm opening is a measure of the distance between the seating ends. It will be understood, however, that in the general case the diaphragm opening may not be circular, and its area may not be a measure of the distance between the seating ends. In such a case the area which is such a measure is the area of an imaginary circle having a diameter equal to the distance between the seating ends. The embodiment of FIGS. 9 to 13 is an example of such a case.

In this embodiment of FIGS. 9 to 13 the body diaphragm opening 86 is of hour-glass shape and with a dimension 88 along the flow passage which is much greater than the dimension 50 along the weir 90 (between the seating ends). An imaginary circle 91 having a diameter equal to the dimension 50 serves as one way of indicating when a diaphragm valve is in accordance with the present invention. Thus the areas of each of the end openings 94 and 96 is at least as great as the area of this imaginary circle 91. The width 92 of the opening on either side of the weir is greater than the dimension 50. One purpose of such a body construction is to postpone the reduction in the cross-sectional area of the passage as long as possible from the end openings 94 and 96, toward the weir 90. The rim 98 of the diaphragm opening 86 is in a flat plane as in the other embodiment, and the weir 90 rises the same distance up toward this opening from the opposite side of the passage as in the embodiment of FIGS. 1 to 8.

To further contribute to the maintenance of full flow right up to the seat the diaphragm 100 is provided with twin bulges 102 which define the passage and smoothly turn it in toward the most restricted part of the passage. In this embodiment this most restricted part is definitely right at the seat. FIG. 12 shows the bulges 102 particularly well. The peripheral portion 104 of the diaphragm is substantially flat so as to fit on the body opening rim 98. At the juncture 106 of the two bulges 102 the diaphragm is spaced on one side of the plane 108 of the undersurface of the peripheral diaphragm portion, and in a cross-sectional end view like FIG. 10 the diaphragm at this juncture has substantially the same shape as a conventional circular diaphragm. The seat 110 on the weir 90 has the same shape as the seat in a conventional diaphragm valve body but is proportionally much smaller than has been used with end openings of the size shown in FIGS. 9 to 13.

The backside of the diaphragm 100 is provided with the usual boss 112 in which a stud 114 is embedded, and the compressor 116 to which the stud is secured has a recess 118 to receive the boss and an under surface 120 which fits the back side of the diaphragm bulges 102 in the open position and which follows the curve of the weir along the length of the latter. The bonnet 122 has a flange 124 matching the peripheral diaphragm portion and regions 126 which support the diaphragm bulges 102 in the valve open position. The upper parts of the bonnet have the form of a cylinder in which the generally circular form of compressor 116 fits and moves. The arrangement for stem mounting and actuation and for preventing compressor rotation are either conventional or have already been described in the other embodiments and need not be repeated here.

FIGURE 14 illustrates the three basic types of characteristic curves which are achieved in valve work. In this graph stem position in percent of full open position is plotted against flow, assuming the same constant pressure drop across the valve at all times and assuming that a reciprocating stem is used. Curve 130 shows a linear relationship between stem position and flow. Such a curve is not often achieved, but its inclusion here serves to differentiate the other two curves. One of these curves 132 is characterized by a concave form indicating that as the valve is opened a given amount of stem movement has progressively less effect on flow. On the other hand, curve 134 is characterized by a convex form indicating that as the valve is opened a given amount of stem movement has progressively more effect on flow. In a particular form of a convex curve the relationship is reached in which a given percentage change in stem movement anywhere in the range of stem movement produces the same percent change in flow. Such a curve is called an equal percent curve, and it is very good for control valve work. However, even if a curve is not exactly in the equal percent form it is much better for it to be like curve 134 than curves 130 or 132. One of the features of the present invention is the achievement of characteristic curves which are closer to the exponential form than has been possible in the prior art.

In the FIGS. 1 to 8 embodiment the bonnet 84 is of the prior art construction, that is, the flange 82 overlies only the diaphragm peripheral portion 56, it being intended that the compressor 133 within the bonnet overlies all the central diaphragm portion 58. The vertical grooves 134 in the bonnet inner surface at the ends of the weir are engaged by long arms 136 on the compressor opposite the weir. These arms have their ends guided in the bonnet grooves 134.

As in other diaphragm valves the upper end of the bonnet serves as a journal 138 for a stem bushing 140 which is threaded around a stem 142 and is rotated by a handwheel. It will be understood, of course, that control valves today are almost always actuated by motors of some kind rather than by handwheels.

The compressor 133 is pivotally connected to the lower end of the stem by a pin 144 passing through a boss 146. Connection between the diaphragm and compressor is achieved by inserting the diaphragm boss 60 into a recess 148 therefor in the compressor and threading the stud 72 in a hole 150 therefor in the center of the recess 148.

The reduction contemplated in this embodiment is much more substantial than any reduction which might exist in the prior art as evidenced by the fact that if the diaphragm opening, diaphragm and bonnet are for a one and one half inch valve, that is for use in a 1½″ pipe line, the end openings shown in this embodiment are those of a three inch valve. In this kind of embodiment where the shapes of the elements are generally like the prior art but the proportions are wholly different, giving rise to the surprising results, a construction performs in accordance with the present invention when the cross-sectional area of the diaphragm opening is smaller than, substantially equal to, or, at most, only slightly greater than the cross-sectional area of the end connections. With the reduction in cross-sectional area of the passage which results from such a proportion the described improvement in characteristic curves occurs.

I claim:
1. A diaphragm valve having:
   (I) an elongated hollow body having:
      (A) walls which:
         (1) define valve body sides,
         (2) terminate in opposite valve body ends,
         (3) have interior and exterior surfaces,
      (B) a long dimension measured between said ends,
      (C) a seat which is located:
         (1) on the interior wall surfaces,
         (2) between said valve body ends,
      (D) a diaphragm opening which:
         (1) is located:
            (a) in one of said valve body sides,
            (b) opposite said seat,
         (2) extends through said walls,
         (3) has a width dimension measured:
            (a) at said seat,
            (b) at right angles to said long dimension,

(E) an end opening which:
    (1) is located at one of said body ends,
    (2) lies in a first plane at substantially right angles to said long dimension,
    (3) has an area at least as great as the area of a circle having a diameter equal to said diaphragm opening width dimension,
(II) a flexible diaphragm which:
    (A) covers said diaphragm opening,
    (B) has an outer portion in permanent contact with said body around said diaphragm opening,
    (C) has a center portion which:
        (1) is bulged,
        (2) is movable into and out of contact with said seat and to different positions from fully closed to fully open,
        (3) when in fully open position, forms with said seat a flow opening measured in a plane parallel to said first plane, which is considerably less in area than said end opening area,
(III) means for clamping said outer diaphragm portion against said body around said diaphragm opening,
(IV) means for moving said diaphragm center portion.

2. A diaphragm valve according to claim 1 wherein said end opening is substantially circular.

3. A diaphragm valve according to claim 1 wherein said diaphragm opening substantially follows a circle having a diameter equal to said diaphragm opening width dimension.

4. A diaphragm valve according to claim 1 wherein both said end opening and said diaphragm opening are substantially circular.

5. A diaphragm valve according to claim 1 wherein said body has:
(F) a flow passage which:
    (1) extends from said end opening to said seat,
    (2) is defined by said interior wall surfaces,
    (3) has a portion in which, at each point along the portion length:
        (a) said interior wall surfaces form an endless intersection on a plane which:
            (i) passes through said point,
            (ii) is parallel to said first plane,
        (b) the area contained by said endless intersection is at least as great as the area of a circle having a diameter equal to said diaphragm opening width dimension.

6. A diaphragm valve according to claim 5 wherein said end opening is substantially circular.

7. A diaphragm valve according to claim 5 wherein said diaphragm opening substantially follows a circle having a diameter equal to said diaphragm opening width dimension.

8. A diaphragm valve according to claim 5 wherein both said end opening and said diaphragm opening are substantially circular.

9. A diaphragm valve according to claim 1 wherein said body has:
(F) another end opening which:
    (1) is located at the other of said body ends,
    (2) lies in a second plane which is substantially parallel to said first plane,
    (3) has an area at least as great as the area of a circle having a diameter equal to said diaphragm opening width dimension.

10. A diaphragm valve according to claim 9 wherein said end openings are both substantially circular and have substantially the same diameter.

11. A diaphragm valve according to claim 9 wherein said diaphragm opening substantially follows a circle having a diameter equal to said diaphragm opening width dimension.

12. A diaphragm valve according to claim 9 wherein said end openings and said diaphragm opening are all substantially circular.

13. A diaphragm valve having:
(I) an elongated hollow body having:
    (A) walls which:
        (1) define valve body sides,
        (2) terminate in opposite valve body ends,
        (3) have interior and exterior surfaces,
    (B) a long dimension measured between said ends,
    (C) a seat which is located:
        (1) on the interior wall surfaces,
        (2) between said valve body ends,
    (D) a diaphragm opening which:
        (1) is located:
            (a) in one of said valve body sides,
            (b) opposite said seat,
        (2) extends through said side walls,
        (3) has a width dimension measured:
            (a) at said seat,
            (b) at right angles to said long dimension,
    (E) an end opening which:
        (1) is located at one of said body ends,
        (2) lies in a first plane at substantially right angles to said long dimension,
        (3) has a maximum dimension which:
            (a) is measured in said plane,
            (b) is at least as great as said diaphragm opening width dimension,
(II) a flexible diaphragm which:
    (A) covers said diaphragm opening,
    (B) has an outer portion in permanent contact with said body around said diaphragm opening,
    (C) has a center portion which:
        (1) is bulged,
        (2) is movable into and out of contact with said seat and to different positions from fully closed to fully open,
        (3) when in fully open position, forms with said seat a flow opening measured in a plane parallel to said first plane, which is considerably less in area than said end opening area,
(III) means for clamping said outer diaphragm portion against said body around said diaphragm opening,
(IV) means for moving said diaphragm center portion.

14. A diaphragm valve according to claim 13 wherein said end opening is substantially circular.

15. A diaphragm valve according to claim 13 wherein said diaphragm opening substantially follows a circle having a diameter equal to said diaphragm opening width dimension.

16. A diaphragm valve according to claim 13 wherein said body has:
(F) a flow passage which:
    (1) extends from said end opening to said seat,
    (2) is defined by said interior wall surfaces,
    (3) has a portion in which, at each point along the portion length:
        (a) said interior wall surface forms an endless intersection on a plane which:
            (i) passes through said point,
            (ii) is parallel to said first plane,
        (b) the area enclosed by said intersection has a maximum dimension which is greater than said diaphragm opening width dimension.

17. A diaphragm valve according to claim 16 wherein said end opening is substantially circular.

18. A diaphragm valve according to claim 13 wherein the said maximum dimension of said flow passage portion is a width dimension measured in said intersection plane in a direction parallel to said diaphragm opening width dimension.

19. A diaphragm valve according to claim 16 wherein the said maximum dimension of said flow passage portion is a height dimension measured in said intersection plane in a direction at right angles to said diaphragm opening width dimension.

20. A diaphragm valve according to claim 13 wherein said end opening maximum dimension is the end opening width measured in said first plane in a direction parallel to said diaphragm opening width dimension.

21. A diaphragm valve according to claim 13 wherein said end opening maximum dimension is the end opening height measured in said first plane in a direction at right angles to said diaphragm opening width dimension.

22. A diaphragm valve having:
 (I) an elongated hollow body having:
  (A) walls which:
   (1) define valve body sides,
   (2) terminate in opposite valve body ends,
   (3) have interior and exterior surfaces,
  (B) a longitudinal axis,
  (C) a diaphragm seat which:
   (1) is located:
    (a) on the interior wall surfaces on one side of said valve body,
    (b) between said valve body ends,
   (2) has a narrow seating surface which:
    (a) is presented toward the opposite side valve body,
    (b) has spaced apart ends,
  (D) a diaphragm opening which:
   (1) is located in the valve body side opposite said seat,
   (2) is substantially circular,
   (3) lies in a plane substantially parallel to said axis,
   (4) has a rim which blends smoothly with said diaphragm seating surface ends,
  (E) an inlet opening and an outlet opening which:
   (1) are located at said opposite valve body ends,
   (2) lie in spaced apart parallel planes perpendicular to said axis,
   (3) are substantially circular,
   (4) have substantially equal diameters at least as great as the distance between said spaced apart seating surface ends,
 (II) a flexible diaphragm which:
  (A) covers said diaphragm opening,
  (B) has an outer portion with one side thereof in permanent contact with said diaphragm opening rim,
  (C) has a center portion which:
   (1) is bulged with respect to said diaphragm opening plane,
   (2) is movable:
    (a) into engagement with said seat surface to close the valve,
    (b) out of engagement with said seat surface to open the valve,
   (3) when in fully open position, forms with said diaphragm seat a flow opening measured in a plane parallel to said spaced apart parallel planes, which is considerably less in area than the area of either of said inlet and outlet openings,
 (III) a hollow bonnet having:
  (A) an end opening which:
   (1) covers said diaphragm opening in said body,
   (2) has an annular surface therearound engaging the outer diaphragm portion on the other side thereof,
  (B) means:
   (1) for securing said bonnet to said body,
   (2) for squeezing said bonnet opening surface:
    (a) against said outer diaphragm portion,
    (b) toward said diaphragm opening rim,
 (IV) a compressor which:
  (A) is located within said bonnet,
  (B) is connected to said diaphragm center portion,
  (C) is movable with respect to said bonnet and body toward and away from said seat.

References Cited by the Examiner

UNITED STATES PATENTS

| | | | |
|---|---|---|---|
| 2,716,017 | 8/1955 | Linker | 251—331 |
| 2,853,270 | 9/1958 | Boteler | 251—331 |
| 2,963,266 | 12/1960 | Boteler | 251—331 |

FOREIGN PATENTS 639,453  4/1962  Canada.

ALAN COHAN, *Primary Examiner.*